July 19, 1949. D. H. NELSON 2,476,318
DIRECT CURRENT MEASURING AND RECORDING DEVICE
Filed Sept. 7, 1944
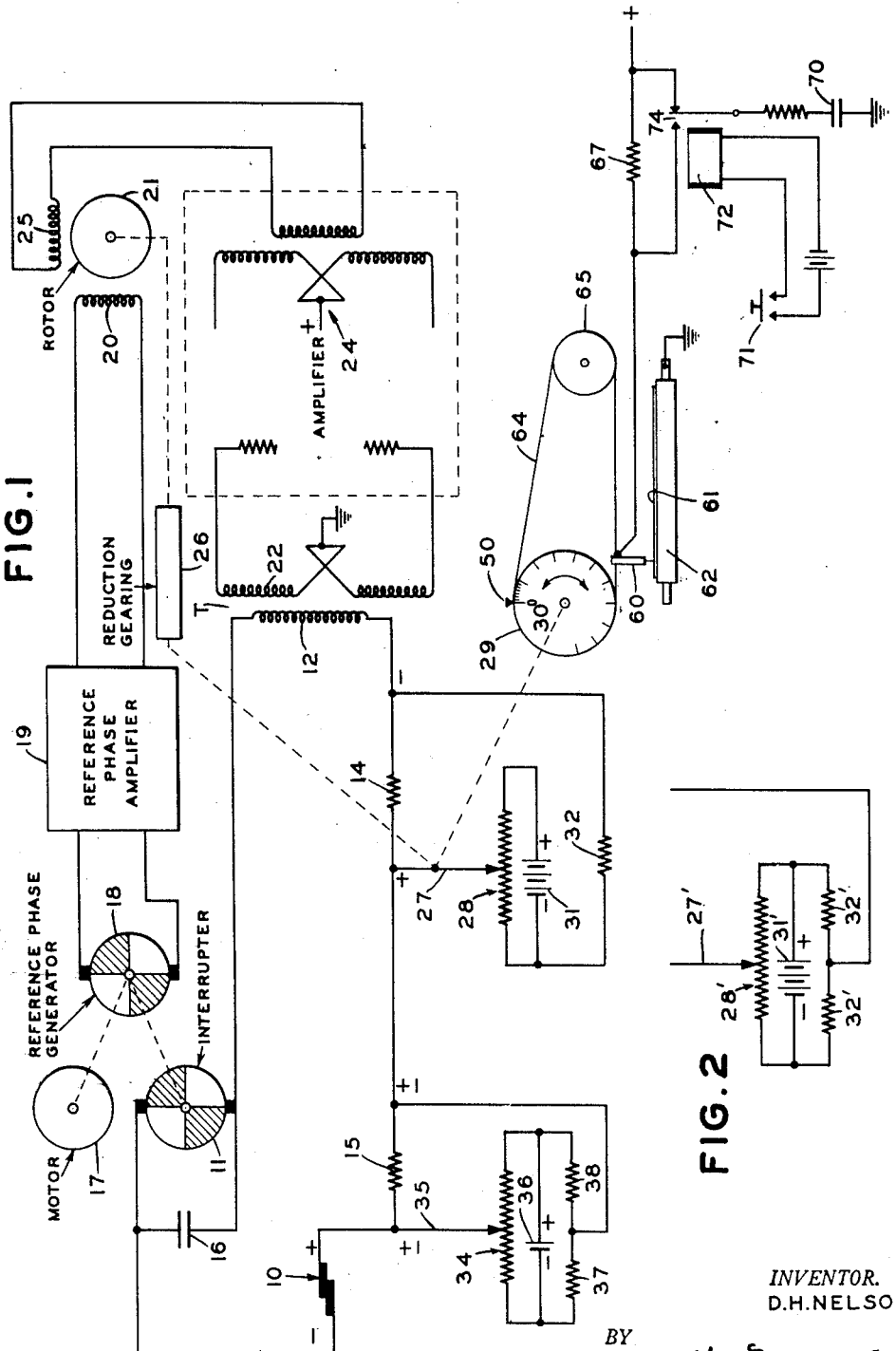
*INVENTOR.*
D. H. NELSON
BY W. C. Middleton
ATTORNEY Patented July 19, 1949

2,476,318

UNITED STATES PATENT OFFICE 2,476,318

DIRECT-CURRENT MEASURING AND RECORDING DEVICE

Dale H. Nelson, Water Mill, N. Y., assignor to The Western Union Telegraph Company, New York, N. Y., a corporation of New York Application September 7, 1944, Serial No. 552,945

7 Claims. (Cl. 171—95)

This invention relates to apparatus for indicating or measuring extremely small direct current potentials.

Heretofore difficulty has been experienced in attempting to obtain accurate measurement or indication of small direct current potentials of the order of microvolts or fractions thereof for many reasons, among which may be mentioned the character and value of the internal resistance of the apparatus utilized, which internal resistance serves to prevent an accurate portrayal or determination of the potential involved.

An object of the present invention is to provide new, simple and efficient apparatus for accurately measuring or indicating small direct current potentials.

Another object of the invention is to provide apparatus as aforesaid in which any effect of internal resistance in obtaining the measurement of such potentials is minimized.

Another object of the invention is to provide apparatus of the character before described in which the measurement of small direct current potentials is obtained by automatically introducing an opposite or counter potential to the unknown potential, which counter potential can be accurately determined.

Another object of the invention is to provide apparatus as aforesaid in which the unknown potential is so interrupted that an alternating current can be generated by the interruptions, amplified and used to automatically introduce a counter potential of value equal to the unknown potential.

A further object of the invention is to utilize a power source for introducing the counter or balancing potential, which power source can be employed to activate control devices in various manners.

A further object of the invention is to provide apparatus having incorporated therein manually operable means for determining the position on an indicating scale relative to which measurements are to be made.

A still further object of the invention is to provide in apparatus as before described means for recording measurements of unknown potentials as such measurements are obtained.

In carrying out the foregoing and other objects of the invention, a source of minute direct current potential is included in a circuit which also has therein the primary of a transformer and an interrupting device for cyclically interrupting the current flow in such circuit. This interrupter can be driven in any suitable manner but is preferably driven to interrupt the current flow in such fashion that such interruptions in the flow of current through the primary of the transformer cause the generation, in the secondary of such transformer, of alternating current which can be amplified and the output of the amplifier used to automatically control conditions in the primary circuit. Such control may be by means of a two-phase motor which has applied to a winding thereof exciting voltage generated by the same driving source utilized to drive the interrupter or generated in any other desired manner to obtain an exciting voltage of the same frequency as that of the output of the amplifier before mentioned. This exciting voltage or reference phase is so related to the output of the amplifier that this output can be impressed upon a winding of the motor with the voltage thereof electrically disposed 90° from the reference voltage, whereby upon a reversal in phase of the amplifier voltage the motor will be driven in the opposite direction. The two-phase motor is connected to drive a potentiometer so connected to the primary circuit as to introduce thereinto voltages of relatively small order, and the introduction of such voltages is of an automatic nature and of a character counter to the unknown voltage, the determination of which is desired. Driven also by the control motor before mentioned is a scale member for indicating the counter voltage introduced into the circuit by the potentiometer, which scale member may be used to drive a recording device for linearly recording the measurements so obtained. In addition to the automatically operated potentiometer for introducing counter voltages into the primary circuit, use is made of a second potentiometer for introducing voltages in either direction into the primary circuit for the purpose of initially setting the recording device at zero or at any other desired position.

Other features, objects and advantages of the invention will become apparent by reference to the following detailed description of the accompanying drawings illustrating an embodiment thereof, wherein:

Fig. 1 is a circuit diagram of apparatus incorporating the invention; and

Fig. 2 is a circuit diagram of a modification of part of the circuit so employed.

Referring now to Fig. 1 of the drawings, 10 indicates a source of small direct current potential of any desired type, but for purposes of illustration such device 10 may be in the nature of a thermocouple or other device for generating a small potential. In circuit with the device 10 is an interrupter 11, the primary 12 of a transformer T, and resistances 14 and 15. Shunted across the interrupter 11 is a capacitor 16, the purpose of which will be explained later. The interrupter 11 is driven by a motor 17 of any desired character, but preferably a synchronous motor of substantially 1800 R. P. M. Driven also by motor 17 and, if desired, by the same shaft as interrupter 11 is a reference phase generator 18, the output of which is amplified (where necessary) by amplifier 19 which in turn supplies one winding 20 of a two phase motor 21.

The secondary 22 of the transformer T is connected to an amplifier 24, the output of which is connected to a second winding 25 of the motor 21. The rotor of motor 21 is connected through reduction gearing 26 to the arm 27 of potentiometer 28 and is also connected, if desired, by the same shaft to a disc member 29 having graduations 30 thereon. Associated with potentiometer 28 is a source of direct current, which may be a battery, and a resistor 32, these parts being so related that a potential can be applied across the resistance 14, and in the counter direction to the potential of source 10. A second potentiometer 34 having an arm 35 is associated with a source of direct current 36, which also may be a battery, and with resistors 37 and 38, these parts being so related that a small potential in either direction may be introduced into the circuit, including primary 12, across the resistance 15.

The interrupter 11 is so driven by motor 12 as to cyclically interrupt any current flow in the primary circuit (the circuit including device 10, transformer primary 12 and resistances 14 and 15) at any desired rate, but preferably the interruptions are at the rate of 90 per second. As a result of the interruption of current flow in this primary circuit at that rate, alternating current occurs in the secondary 22 of transformer T, which alternating current can be amplified by amplifier 24. The capacitor 16 may be of any desired capacity such as 8 microfarads and is shunted across the interrupter to cause a greater voltage output in the secondary 22 of the transformer T. This transformer has an air gap in the core thereof which serves to increase the rate of change of flux through the core, thereby increasing the secondary voltage. The transformer may have any desired step-up ratio, but the maximum ratio is preferred, up to the limits of practical transformer design. Amplifier 24 may be of any desired character, but in the preferred form is a tuned amplifier, tuned to the 90 cycles per second alternating current generated by the action of interrupter 11, capacitor 16 and primary 12 of transformer T. As a result of the relation of these parts, when direct current flows through the primary circuit in one direction, the amplified 90 cycle output alternating current has a certain phase, and when the direct current in the primary circuit reverses direction the phase of the output alternating current also reverses.

The motor 21 constitutes a phase selective instrument which responds to the reversing of phase in the winding 25 of the motor (supplied by amplifier 24) in such a manner as to perform an automatic correction or balancing in the primary circuit. This motor, as before mentioned, is a two phase motor and may be of any suitable type, of which type motors known as "drag-cup" are of satisfactory character because of the low inertia of the rotors thereof which generally renders unnecessary the use of anti-hunting devices or circuits. Such a two phase motor will rotate in one direction when both phases are excited with substantially 90° electrically displaced voltages, and if one of the applied voltages is reversed in phase the motor will turn in the opposite direction. Furthermore, if only one phase is excited, the motor will not turn in either direction.

In order that the desired conditions can be obtained, the second or so-called "reference" phase is continuously excited by excitation of winding 20 with constant amplitude and phase from the reference phase source 18 through amplifier 19. To this end the generator 18, which may be a commutator or other type of generator, is so driven, as before pointed out, by the same motor 17 as to generate a reference phase of 90 cycles at 100 volts. By utilizing the same driving motor and, if desired, the same shaft for the interrupter 11 and the reference phase generator 18, generation of the reference phase is synchronized with interruption of current flow in the primary circuit.

Other methods of generating a reference phase could be utilized, if desired, such generators making use of the 60 cycle or other power source, and may be of the nature of harmonic generators or multi-vibrators or a combination of both for generating the desired reference voltage. In the event such harmonic generators or multi-vibrators are used, it follows that a synchronous motor or its equivalent should be used for the interrupter drive, but in the preferred form where these two elements 11 and 18 are on the same shaft it is relatively unimportant whether or not the driving motor 17 is synchronously operated with the power supply system.

The amplifier 24, as pointed out before, is preferably tuned to the operating frequency, namely, 90 cycles, such tuning being provided for maximum gain and for restriction of noise. With the amplifier so tuned, it is necessary that the interrupter driver motor 17 operate to generate an alternating current signal close to the frequency to which this amplifier is tuned. However, by broadening or eliminating the tuning of the amplifier, the entire arrangement then becomes practically independent of frequency.

The operation of the apparatus as previously described is substantially as follows. Assuming that the scale on the disc 29 is positioned with zero opposite the pointer 50, if the device 10 operates to introduce an unknown voltage in the primary circuit, the current resulting from this voltage will be interrupted cyclically at 90 cycles per second, causing the generation of a 90 cycle alternating current which is amplified and impressed upon the winding 25 of motor 21, causing this motor to rotate, the speed of rotation depending upon the amplified voltage. The two motor connections, namely, the windings 20 and 25, are properly oriented so that as the voltage rises in the primary circuit causing an amplified A. C. to be impressed on winding 25, the motor will rotate in a direction to cause the potentiometer arm 27 to be so moved as to introduce a counter voltage into the primary circuit across the resistance 14. Such rotation of the motor will continue until the counter voltage introduced by potentiometer 28 into the circuit balances the unknown voltage generated by device 10, at which time current no longer flows in the primary circuit, and consequently the amplifier alternating current in winding 25 drops to zero, causing the motor 21 to stop. Such movement of the potentiometer arm 27 causes movement of the indicator dial 29, preferably on the same shaft driven by motor 21 through the reduction gearing 26, thereby indicating within an error of less than ½% the voltage introduced into the circuit, and since this voltage is exactly counter to the unknown voltage it follows that the indication so rendered by the dial is a true indication of the voltage generated by device 10. On the other hand, with the system now again in balance, or with a null in the primary circuit, should the voltage generated by device 10 drop beyond that originally balanced, a current will flow in the opposite direction in the primary circuit, resulting in the imposition of alternating current potential in winding 25 at 180° displacement from that previously present therein. Upon the occurrence of this condition, motor 21 rotates in the opposite direction, moving the potentiometer arm 27 in the opposite direction to reduce the counter voltage introduced into the circuit thereby until the primary circuit again reaches a null, at which time the indicator dial comes to rest with again a true indication of the unknown voltage being generated by device 10. Thus, the direction of current flow in the primary circuit determines the direction in which the motor 21 shall rotate, and the two windings 20 and 25 are so oriented that this motor will always rotate in a direction to cause the introduction of a counter potential in the primary circuit of such magnitude as to balance all other potentials in the circuit and thereby cause the primary circuit to become free of any current flow. Since the position of the automatic balancing potentiometer arm 27 is determined only by the requirement that the counter voltage across resistance 14 be equal to the unknown potential in the primary circuit, it follows that this arm position, which is also the position of the indicating disc 29, will be independent of the gain of amplifier 24, power supply voltage and frequency, motor output circuit characteristics, and input circuit total resistance.

The potentiometer 34 with its operating arm 35 may be manually controlled and is utilized for the purpose of introducing a small potential in either direction in the primary circuit so that the indicating dial 29 can be operated through the automatic potentiometer 28 to reach a point at which zero is in register with the pointer 50 prior to the use of the device for measuring D. C. potential. Such manipulation of potentiometer 34 is usually done when the D. C. generating device 10 is inoperative. However, under certain conditions it may be desired to so position the indicator dial that any figure other than zero will be aligned with the pointer at the beginning of a measuring operation so that the value of potentials in both directions in the primary circuit can be measured from an intermediate point on the indicator dial.

In some types of operation it is desirable that the value of the potential generated by source 10 be recorded continuously over a predetermined period of time, to which end use is made of a recording device in the nature of a stylus 60 operating on sensitized paper 61 supported by a driven roller 62, which roller is grounded as indicated. The driving connection for roller 62 has been omitted, but it may be in the nature of a synchronous motor or any other device geared to the roller to cause it to rotate at a desired speed, while the angular motion of the indicator dial 29 is translated into substantially linear motion of the stylus 60. To accomplish this, a driven member 64 in the nature of a tape belt or other suitable arrangement passes over the periphery of the member 29 and over the periphery of an idler roller 65. Since the dial 29 is driven by the motor 21 (being preferably on the same shaft with the potentiometer arm 27) it follows that there is sufficient power in this motor drive to drive the belt 64 and thereby move the stylus 60 across the traveling paper 61. This stylus 60 is connected to a suitable source of energy through a resistor 67. The paper 61 can be provided with suitable coating so that passage of current therethrough from the stylus to the grounded roller 62 will cause the character of the coating to change, and this changed character is readily apparent on the paper. Since the paper itself forms no part of the invention and is well known in the art, further description thereof is unnecessary.

It is sometimes desirable in the process of recording voltage conditions in the primary circuit over an extended period to mark parts of the record for future reference. The continuous record can be so marked by the agency of a condenser 70 which is normally charged by the source energizing the stylus 60. When it is desired to impress a distinctive mark on the paper, a push button 71 can be moved to close a local circuit, energizing relay 72 which, when operated, closes contacts 74, permitting the condenser 70 to discharge through the stylus. The discharge of the accumulated potential from this condenser is sufficient to produce a distinctive mark or dot on the paper representing the position of the stylus at the instant of discharging, which mark is of higher intensity and greater width than the continuous path of the stylus on the paper. The mark can only be made at the instant of closing the local circuit by push button 71, and since this marking is obtained through the discharge of condenser 70 it is necessary to release push button 71, deenergizing relay 72, before the condenser 70 can be recharged for a subsequent marking. Other marking devices can be used in parallel with the stylus 61, if desired, as will be readily apparent, and naturally further illustration does not seem to be necessary. By timing the drive of the roller 62, it is possible to cause the stylus to create a continuous record of the condition of the primary circuit, such record being related to time intervals. It is to be understood, of course, that other conventional means of recording instead of the electrically energized stylus may be employed, such as by ink recording, stroke bars, etc.

Further, since the driving motor 21 and consequently the shaft actuating the potentiometer arm 27 and indicator 29 possesses considerable power, self-synchronizing transmitting devices as are well known in the art may be used for carrying the information presented by the indicator to other locations. In addition, by the use of a potentiometer and a suitable power supply and resistances conventional types of recording meters may be employed. As a further possibility, the shaft driven by motor 21 can be used to control the operation of various mechanical devices associated with the system, all in a well known manner and consequently not illustrated herein.

Where the source 10 is unidirectional, i. e., introduces potential into the primary circuit in one direction only, it follows that the automatic null balancing potentiometer 28 is required to operate uni-polar, as shown in Fig. 1. Should, however, the D. C. generating device 10 be of a bi-polar nature, or if very low frequency alternating current were involved in the primary circuit, the automatic null balancing would then be connected and operated polar to introduce both plus and minus values of counter voltage into the primary circuit. Such a potentiometer arrangement is shown in Fig. 2, wherein it will be seen that the potentiometer arm 27' of potentiometer 28' is connected to battery 31' in the manner of Fig. 1, but instead of using a single resistor 32, use is made of two resistors 32' of equal value with a connection between them to the primary circuit. In this fashion either plus or minus values of counter voltage can be introduced into the primary circuit.

As an example of the voltage values which can be measured by the apparatus, the following will be illustrative. Let it be assumed that the resistance of potentiometer 28 is approximately 20,000 ohms, resistor 32 is 500,000 ohms, battery 31 is 4½ volts, and resistance 14 is 1.2 ohms. Under such conditions full scale sensitivity of indicator 29, that is, from zero to one hundred thereon, is 10 microvolts, and this sensitivity is practically independent of the source 10 resistance for values up to 100 ohms, since the balance results in zero current through the primary circuit, and therefore no internal drop in the source 10. The exact value of 10 microvolts is conditional upon the direct current battery 31 being 4½ volts. Inasmuch as practically no current is used in the apparatus, it follows that such a battery will normally have substantially shelf life. The voltage of this battery may readily be determined with a volt meter, and in instances where its voltage differs from 4½ volts the actual 100% full scale sensitivity of the apparatus may then be calculated by taking the ratio of measuring battery voltage to 4½ volts and multiplying this ratio by 10 microvolts. The scale on indicator 29 is provided with 100 graduations so that each graduation represents $100 \times 10^{-9}$ volts or $3 \times 10^{-9}$ amperes in the primary circuit. By enlarging the diameter of the indicator 29, the graduations may be increased in number with the example that, if these graduations are 400 in number instead of 100, then each graduation will represent $25 \times 10^{-9}$ volts or $0.75 \times 10^{-9}$ amperes in the primary circuit.

When the device employs resistors and the like for the values just described, then the manual balancing potentiometer 34 will likewise have values such as 20,000 ohms for the resistance of the potentiometer 34, 150,000 ohms for each of the resistors 37 and 38, 1½ volts for the battery 36, and 1 ohm for the resistance 15. This arrangement will be sufficient to orient the indicator scale to any desired position under normal conditions.

It will be understood that the example given immediately above is for illustrative purposes only, since by changing the constants in the two potentiometer arrangements and their associated parts, it follows that other ranges in microvolts and fractions thereof can be measured within the limits afforded by the amplifier 24.

From the foregoing it will be seen that the present invention provides new, simple and efficient apparatus for the measurement of very small direct current potentials of the order of microvolts or fractions thereof with extreme accuracy and without the errors inherent in apparatus having internal resistance, variable amplification factors and the like which influence its accuracy. It is further to be understood that changes can be made within the scope of the invention, in view of which any limitations to be imposed thereon are only those set forth in the following claims.

What is claimed is:

1. In apparatus for measuring minute direct current potential, a circuit for the passage of current by said potential, interrupter means for cyclically interrupting the flow of current in said circuit, means controlled by the interrupted current flow for generating alternating current, a two-phase motor having one phase excited by said alternating current, exciter means driven simultaneously and synchronously with said interrupter means for continuously exciting the other phase of said motor, said exciter means and said interrupter means being driven to cause the generation of alternating currents of a frequency different from that of the source utilized in the driving thereof, and means driven by said motor for automatically introducing an equal counter-potential in said circuit to balance said circuit.

2. In apparatus for measuring minute direct current potential, a circuit for the passage of current by said potential, interrupter means for cyclically interrupting the flow of current in said circuit, means controlled by the interrupted current flow for generating alternating current, an amplifier for said alternating current, a two-phase motor, exciter means driven simultaneously and synchronously with said interrupter means for exciting one phase of said motor, the other phase of said motor being excited by said alternating current, said exciter means and said interrupter means being driven to cause the generation of alternating currents of a frequency different from that of the source utilized in the driving thereof and in energizing said amplifier, and means driven by said motor for automatically introducing an equal counter-potential in said circuit to balance said circuit.

3. In apparatus for measuring minute direct current potential from a source of such potential, a circuit for the passage of current by said potential, a resistor of low resistance in said circuit, and means automatically actuated by the passage of current in said circuit for introducing an equal counter-potential in said circuit to balance any potential from said source in said circuit, said means including a local source of potential, a potentiometer thereacross and connected to said circuit at one end of said resistor of low resistance, and a resistor of high resistance relative to said first resistor in series with said local source and said potentiometer and connected to said circuit at the other end of said resistor of low resistance.

4. In apparatus for measuring minute direct current potential from a source of such potential, a circuit for the passage of current by said potential, a resistor of low resistance in said circuit, means automatically actuated by the passage of current in said circuit for introducing an equal counter-potential in said circuit to balance any potential from said source in said circuit, said means including a local source of potential, a potentiometer thereacross and connected to said circuit at one end of said resistor of low resistance, and a resistor of high resistance relative to said first resistor in series with said local source and said potentiometer and connected to said circuit at the other end of said resistor of low resistance, and separate means for introducing potential in either direction into said circuit.

5. In apparataus for measuring minute direct current potential from a source of such potential, a circuit for the passage of current by said potential, means for cyclically interrupting the flow of current in said circuit, means controlled by the interrupted current flow for generating alternating current, a resistor of low resistance in said circuit, and means controlled by said alternating current for automatically introducing an equal counter-potential in said circuit to balance any potential from said source in said circuit, said last mentioned means including a local source of potential, a potentiometer thereacross and connected to said circuit at one end of said resistor of low resistance and a resistor of high resistance relative to said first resistor in series with said local source and said potentiometer and connected to said circuit at the other end of said resistor of low resistance.

6. In apparatus for measuring minute direct current potential from a source of such potential, a circuit for the passage in either direction of current by said potential, means for cyclically interrupting the flow of current in said circuit, means controlled by the interrupted current flow for generating alternating current of a phase determined by current direction in said circuit, a resistor of low resistance in said circuit, and means responsive to the generation of alternating current for automatically introducing an equal counter-potential in either direction in said circuit to balance any potential from said source in said circuit, said last mentioned means including a local source of potential, a potentiometer thereacross and connected to said circuit at one end of said resistor of low resistance, and a resistor of high resistance relative to said first resistor in series with said local source and said potentiometer and connected to said circuit at the other end of said resistor of low resistance, said last mentioned means being responsive to phase reversal in the alternating current generated.

7. In apparatus for measuring minute direct current potential from a source of such potential, a circuit for the passage of current in either direction by said potential, means for cyclically interrupting the flow of current in said circuit, means controlled by the interrupted current flow in said circuit for generating alternating current, a resistor of low resistance in said circuit, means responsive to the generated alternating current for automatically introducing an equal counter-potential in either direction in said circuit to balance any potential from said source in said circuit, said last mentioned means including a local source of potential, a potentiometer thereacross and connected to said circuit at one end of said resistor of low resistance and a resistor of high resistance relative to said first resistor in series with said local source and said potentiometer and connected to said circuit at the other end of said resistor of low resistance, means for indicating the value of said counter-potential, and manually operable means for introducing potential in either direction into said circuit to set said indicating means.

DALE H. NELSON.

REFERENCES CITED

The following references are of record in the file of this patent:

UNITED STATES PATENTS

| Number | Name | Date |
| --- | --- | --- |
| 1,784,522 | Harrison | Dec. 9, 1930 |
| 2,037,924 | Rentschler | Apr. 21, 1936 |
| 2,150,006 | Parker et al. | Mar. 7, 1939 |
| 2,284,476 | MacKay | May 26, 1942 |
| 2,306,479 | Jones | Dec. 29, 1942 |
| 2,367,868 | Jones | Jan. 23, 1945 |